United States Patent [19]

Travers et al.

[11] Patent Number: 4,789,655

[45] Date of Patent: Dec. 6, 1988

[54] CATALYST OF HIGH MORDENITE CONTENT FOR ISOMERIZING NORMAL PARAFFINS AND PROCESS FOR PRODUCING THE CATALYST

[75] Inventors: Christine Travers, Rueil Malmaison; Jean-Paul Bournonville, Cergy Pontoise; Jean-Pierre Franck, Bougival, all of France

[73] Assignee: Institut Francais Du Petrole, Rueil-Malmaison, France

[21] Appl. No.: 84,944

[22] Filed: Aug. 13, 1987

[30] Foreign Application Priority Data

Aug. 13, 1986 [FR] France ................................ 86 11795

[51] Int. Cl.$^4$ .......................... B01J 29/22; B01J 29/24
[52] U.S. Cl. ........................................ 502/66; 502/73; 502/78
[58] Field of Search ........................ 502/37, 73, 78, 66

[56] References Cited

U.S. PATENT DOCUMENTS

| | | | |
|---|---|---|---|
| 3,751,502 | 8/1973 | Hayes et al. ........................ | 502/78 X |
| 3,932,554 | 1/1976 | Takase et al. ...................... | 502/78 X |
| 3,986,982 | 10/1976 | Crowson et al. ..................... | 502/37 |
| 4,657,874 | 4/1987 | Borghard et al. ................ | 502/37 X |

*Primary Examiner*—W. J. Shine
*Attorney, Agent, or Firm*—Millen & White

[57] ABSTRACT

A catalyst for isomerizing a hydrocarbon cut of high n-paraffin content is disclosed. The catalyst is obtained by controlled oxychlorination of a solid containing at least one group VIII metal supported on an acid mordenite, said mordenite having a sodium content lower than 0.2% by weight, adsorbing molecules of a kinetic diameter larger than about 6.6 Angströms, having a mesh volume, V, of the elementary mesh from 2.73 to 2.78 nm$^3$ and a benzene adsorption capacity higher than 5% by weight, said oxychlorination being conducted at a temperature of about 200°-500° C. by means of a gas mixture containing oxygen, water, chlorine or at least one chlorinated compound used in a total amount from 0.5 to 10% by weight of chlorine, in proportion to the mordenite weight. The catalyst may further contain a matrix, the mordenite amount being at least 40% by weight of the total amount of mordenite and matrix.

13 Claims, No Drawings

CATALYST OF HIGH MORDENITE CONTENT FOR ISOMERIZING NORMAL PARAFFINS AND PROCESS FOR PRODUCING THE CATALYST

The present invention concerns a process for manufacturing a catalyst comprising amordenite in acid form and at least one group VIII metal of the periodic classification of elements, of enhanced activity, as well as its use in various hydrocarbon conversions and particularly for the isomerization of normal paraffins. The present invention also concerns the catalyst obtained by said process as well as a process for hydroisomerizing normal paraffins contained in a hydrocarbon cut comprising a high proportion of normal paraffins, having for example from 4 to 7 carbon atoms per molecule, in the presence of said catalyst.

BACKGROUND OF THE INVENTION

The isomerization of normal paraffins of low molecular weight is highly important in the oil industry in view of the very high octane number of the isoparaffins formed.

Modifications in the regulations in force in the main industrialized countries, concerning the quality standards for motor-car gasolines and the progressive elimination of lead-containing additives, oblige the producers of said products to search for improved processes for obtaining lead-free motor-car gasolines of high octane number. The processes for converting normal paraffins having for example 4, 5, 6, or 7 carbon atoms per molecule, particularly n-paraffins of 5 and 6 carbon atoms per molecule, to a product of high isoparaffin content are of particular interest.

By these processes, in particular, the octane number of the light gasoline fractions, such as straight-run gasolines or for example those obtained by catalytic reforming, are improved. The mechanism of the hydroisomerization reaction is usually considered to be a bifunctional mechanism for which the preferred catalysts are those comprising simultaneously acid sites and sites having a hydrogenating/dehydrogenating function.

In the last twenty years, many papers mention the use, in hydroisomerizatin processes, of catalysts essentially formed of zeolites more or less deeply modified, particularly mordenites, usually in acid form, with a hydrogenation promoter. As an example, patents to SHELL Company concern the use of catalysts essentially formed of mordenites modified according to particular processes : U.S. Pat. Nos. 3,842,114, 4,359,409 and 4,400,576.

Other relevant patents are patents to ESSO Company using partially dealuminated mordenites : U.S. Pat. Nos. 3,480,539 and 3,506,400, and a patent of MOBIL Company, U.S. Pat. No. 3,551,353.

SUMMARY OF THE INVENTION

The present invention has as an object an improved for hydroisomerizing a hydrocarbon cut of high n-paraffin content, having for example 4 to 7 carbon atoms per molecule, preferably 5 and/or 6 carbon atoms per molecule, in the presence of an improved catalyst containing at least one group VIII metal, preferably platinum, palladium or nickel, supported on a mordenite in acid form.

The efficiency of the catalyst depends in particular on good dispersion of the metal onto the mordenite in acid form. The highest possible dispersion of the metal onto the mordenite is thus desirable in order that a maximum of metal atoms be accessible to the reactants. The size of the metal crystallites must be small, preferably at most about 10 Angströms, and their distribution as homogeneous as possible.

To date, for catalysts essentially formed of mordenite in acid form, it is very difficult, by conventional impregnation techniques, to directly obtain metal particles of small size well distributed onto the mordenite.

It has been discovered, according to the invention, that, when the solid comprising essentially mordenite in acid form containing at least one group VIII metal is subjected to an oxychlorination treatment under moderate conditions not modifying the structure of the mordenite, the dispersion of the group VIII metal is highly improved, thus giving a very active catalyst, particularly for the isomerization reaction.

Mordenite is a natural or synthetic alumino-silicate characterized by a Si/Al atomic ratio generally ranging from 4 to 6. Its crystalline structure is constituted by linking of $SiO_4$ and $AlO_4$ tetrahedrons, generating two types of channels: channels with dodecagonal opening (contour with 12 oxygens) and channels with octogonal opening (contour with 8 oxygens).

The mordenite, an essential constituent of the catalyst used in the process of isomerizing n-paraffins according to the present invention, may also be dealuminated according to methods known in the art. The Si/Al atomic ratio of the mordenite is usually from about 5 to about 50 although mordenites with a higher Si/Al atomic ratio, for example up to 80 or more, may be also used.

Preferably the Si/Al atomic ratio of the mordenite will range from 5 to 30.

The mordenite may be of the so-called wide-pore type, of spherulite morphology, always synthetic, or of the so-called small-pore type, of needle morphology, having "unclogged" channels, as disclosed for example in the French patent application filed under serial No. 85/05 351 on Apr. 5, 1985, issued under No. 2 579 906 and corresponding to the U.S. patent applications Ser. No. 848,547 of Apr. 7, 1986, now abandoned, and Ser. No. 001,151, a "Continuation in part" filed on Jan. 7, 1987, now U.S. Pat. No. 4,727,217. To be useful in the process according to the invention, the mordenite must always be able to adsorb molecules of a kinetic diameter larger than about 6.6 Angstroms, such as the benzene molecule. The mordenite, either synthetic or natural, is initially in salt form and usually contains from 4 to 6.5% by weight of sodium in proportion to the dry mordenite weight. It is thus necessary to effect its conversion into acid form, by any process known in the art, in order to obtain a mordenite in acid form whose sodium content is lower than about 0.2% by weight and preferably lower than 0.1% by weight in proportion to the weight of dry mordenite. The mordenite is considered as being in acid form for the purpose of the present invention when it contains less than about 0.2% by weight and preferably less than about 0.1% by weight of alkali and alkaline-earth cations, expressed in sodium weight equivalent in proportion to the weight of dry mordenite. The mordenite must also have a mesh volume, V, of the elemental mesh, ranging from 2.63 to 2.78 cubic nanometers ($nm^3$) and preferably from 2.74 to 2.77 $nm^3$ and its benzene adsorption capacity must be at least 5% and preferably at least 8% by weight in proportion to the weight of dry mordenite.

The so-defined mordenite is used to prepare the catalyst, either as such or intimate mixture with a matrix, usually amorphous, for example with a wet powder of alumina gel. The mixture is then shaped, for example by extrusion through a drawing-plate.

The mordenite content of the carrier must be at least 40% preferrably higher than about 40% and preferably higher than about 60% (by weight). This mordenite content is usually from 40 to 95% by weight, preferably from about 60 to 90% by weight, in proportion to the total amount of mordenite and matrix.

Shaping may be performed with other matrices than alumina, such for example as silica-alumina, natural clays (e.g. kaolin or bentonite) and alumina-boron oxide, and with the use of techniques other than extrusion, such for example a pelletizing, bowl-granulation or any other technique known in the art.

The group VIII hydrogenating metal is then deposited onto said carrier by any process known in the art for depositing metal onto mordenite. For platinum, a cation exchange process would be used for example with a platinum tetrammine complex, the metal will then deposit practically completely onto the mordentie. It is also possible to introduce the group VIII metal directly onto mordentie before its optional admixture with a matrix.

The use of the cation exchange technique may be applied for depositing the metal either on the mordentie powder or on an already shaped product with or without competing ammonium cations. The metal may also be deposited onto extrudates or powder by the so-called dry impregnation technique. The dry product is then usually roasted in the range of 300°-600° C.

The obtained solid usually contains about 0.05-10% by weight of group VIII metal. For platinum and palladium the content (by weight) is usually about 0.05-1%, preferably about 0.1-0.6%. For nickel the content by weight is usually 0.1-10%, preferably 0.2-5%.

The solid, comprising a high proportion of mordenite in acid form and a group VIII metal, is then subjected to an oxychlorination treatment by contacting it with chlorine and/or with a chlorinated compound in the presence of an oxygen-containing gas and of steam, at a temperature of about 200°-500° C., preferably 300°-480° C., the total amount of a chlorine and/or chlorinated compound being about 0.5-10% by weight, preferably about 1-5% by weight, calculated as chlorine weight in proportion to the mordenite weight.

The oxychlorination of the solid of high mordenite content may be performed "ex situ" on "in situ".

By "in situ" treatment it is meant a treatment which is performed at the top of the one or more zone(s) where is conducted the proper isomerization reaction or in one or more zone(s) more or less directly communicating with said isomerization zone.

By "ex situ" treatment it is meant a treatment which is performed either in the vicinity of the isomerization industrial unit or in a zone which is not in the close vicinity of said isomerization zone or geographically at a distance from the industrial unit (e.g., at the place where the solid has been manufactured).

The oxychlorination treatment usually consists of heating the solid, comprising at least one group VIII metal deposited on acid mordenite, in the presence of a gas stream containing oxygen and steam, for example wet air or oxygen diluted with an inert gas, the oxygen content of the gas mixture being usually from about 10 to 50%, preferably about 15-35% by weight and its water content by weight being usually 0.01-5%, preferably 0.03-4% and often more advantageously about 0.05-1%. The heating in the presence of the oxygen-containing gas mixture and water is usually performed progressively up to the selected temperature. The temperature increases for example by 5° C. per minute until the selected temperature has been reached.

In the stream of oxygen gas and steam, maintained at the selected temperature, chlorine ($Cl_2$) and/or at least one chlorinated compound, for example hydrochloric acid (HCl) or an organic chlorinated compound such as carbon tetrachloride, dichloropropane, dichloroethane or chloroform is introduced.

The chlorine or chlorized compound feeding rate is usually calculated so that the time required for introducing the selected chlorine amount be about 0.5-6 hours, preferably 1.5-2 hours. After the end of the chlorine introduction, the catalyst is usually cooled in the presence of the above-described oxygen- and steam-containing gas stream, to room temperature.

The residual chlorine content in the catalyst is usally at mosts 50% by weight and often at most 30% by weight of the chlorine feed, In this proportion, chlorine is not detrimental to the structure of the mordenite: i.e., the structure of the mordenite is substantially unchanged.

Before the oxychlorination treatment, metal (e.g. platinum) crystallites are observed on the solid by electron microscopy. Their size distribution is completely heterogeneous. The smaller ones, present in a very small amount, are smaller than the detection limit of the electron microscopy (7 Angströms) and the larger, which are faceted and grouped in colonies, have a size which may reach 200 nm (2000 Angströms).

After the oxychlorination treatment, the size distribution of the metal crystallites in the mordenite is much more homogeneous. The number of crystallites to be observed by electron microscopy has substantially decreased, thus showing that, in major part, they have a smaller size than the detection limit of the apparatus, which is 7 Angströms.

The above-mentioned particle sizes have been measured by means of a high-resolution electron microscope. The catalyst to be observed by transmission electron microscopy is crushed in an agate mortar, then suspended into ethanol by ultrasound. A drop of said suspension is then deposited on a copper grid covered with a thin film of carbon with holes. After quick drying, the sample is observed by the so-called clear field technique.

The catalyst obtained by the oxychlorination treatment is usually subjected to a reduction by means of a gas containing at least one reducing compound before being contacted with the hydrocarbons and hydrogen charge under isomerization conditions. The reducing compound is usually hydrogen. Industrial hydrogen is preferably used as gas containing at least one reducing compound. Substantially pure hydrogen, i.e. containing less than 0.5% by volume and preferably than 0.1% by volume of impurities may also be used.

This reduction is usually performed in stages up to a temperature of 350°-750° C., preferably 400°-600° C., for a sufficient time to obtain the same concentration of reducing compounds at the input and at the output of the reactor, thus showing that the reduction, in the selected conditions, is complete. This reducing step is preferably performed "in situ".

According to the invention, the charge, containing a high proportion of light paraffins, for example with 5 and/or 6 carbon atoms, and hydrogen, are contacted with an oxychlorinated catalyst of the above-described type under isomerization conditions. This contact may be conducted with a fixed-bed or fluid bed or fluid bed catalyst or batchwise.

The isomerization step of the process according to the invention is usually performed at a temperature of 200°–350° C., preferably 230°–300° C. under $H_2$ partial pressures ranging from atmospheric pressure (0.1 MPa) to 7 MPa, preferbly from 0.5 MPa to 5 MPa. The space velocity may range from 0.1 to 20 liters of liquid hydrocarbons per liter of catalyst and per hour, preferably from 1 to 10. The molar ratio $H_2$/charge may vary within wide limits and is usually from 0.2 to 20, preferably from 0.5 to 10. The isomerization being a balanced reaction, the isomerizate still contains a substantial amount of unconverted n-paraffins. These paraffins may be separated from isomers, for example by distillation or fractionation over a molecular sieve, and recycled to the isomerization unit.

The hydrocarbon cut used as the feed generally contains at least 80% by weight, preferably at least 90% by weight of n-paraffins having 4, 5, 6 or 7 carbon atoms. The hydrocarbon cuts containing at least 80% by weight of hydrocarbons with 5 and/or 6 carbon atoms and preferentially at least 90% by weight of said hydrocarbons, are preferred.

The thermodynamic balance between the different isomers varies to a large extent with the temperature. Branched hydrocarbons, which are those of high octane number, are the most favored as the temperature decreases. The problem of isomerizing n-paraffins involves finding catalysts which are active at the lowest possible temperature. The number of moles of 2,2-dimethylbutane (2,2 $DMC_4$) whose octane number is one of the highest among the $C_6$ isomers must not exceed, at a given temperature, its value at thermodynamic equilibrium: "Chimie des hydrocarbures" by G. Lefebvre. Technip Publishing 1978, p. 89–91 and U.S. Pat. No. 4,238,319 (column 1, line 20–66). The approach to equilibrium, in percent for 2,2 $DMC_4$, is defined as the number of moles of 2,2 $DMC_4$ in the reaction effluent (still called collected amount) multiplied by hundred and divided by the number of moles of 2,2 $DMC_4$ at thermodynamic equilibrium at the considered temperature. By this measurement the relative activities of the catalysts can be easily compared.

EXAMPLES

The following examples illustrate the invention without however limiting the scope thereof.

The performance of the catalysts are defined by the conversion (C) of n-hexane, the isomerization selectivity (S), the approach to equilibrium (Ap) on 2,2-dimethylbutane and the Research octane number (RON).

Conversion (C %) =

$$\frac{\text{(n-hexane input weight} - \text{n-hexane output weight)} \times 100}{\text{n-hexane input weight}}$$

Selectivity (S %) = $\frac{\Sigma(\text{weight of isomers}) \times 100}{\Sigma(\text{weight of reaction products})}$ Approach at equilibrium (Ap %) =

-continued $$\frac{\text{(Number of moles of 2,2 DMC}_4 \text{ in the collected amount)} \times 100}{\text{Number of moles of 2,2 DMC}_4 \text{ at equilibrium}}$$

EXAMPLE 1

Preparation of catalyst A (comparative)

The raw material is a small-pore mordenite of reference Alite 150 manufactured by Société Chimique de la Grande Paroisse. Its chemical formula in anhydrous state, is Na $AlO_2(SiO_2)_{5.5}$ and its benzene adsorption/capacity is 1% by weight with respect to the dry solid weight (mesh volume: 2.79 $nm^3$; sodium content: 5.3% by weight, kinetic diameter of the adsorbed molecules: 3.8 Angstroms; 50 g of said powder are dipped into a 2M ammonium nitrate solution and the suspension is brought to 95° C. for 2 hours.

The involved volume of ammonium nitrate solution is 4 times the weight of dry zeolite (V/P=4). This cation exchange operation is renewed 3 times. After the 3rd exchange, the product is washed with water at 20° C. for 20 minutes with a V/P ratio equal to 4. The sodium content, expressed in percent by weight with respect to the dry weight, decreases from 5.5 to 0.1%. The product is then filtered and subjected to roasting in confined atmosphere (self steaming) at 600° C. for 2 hours.

Then an acid etching is performed with 0.58 N hydrochloric acid, bringing the product to reflux in the aqueous solution of hydrochloric acid at 90° C. for 2 hours with a V/P ratio equal to 8. The product is then filtered, washed with 0.1 N hydrochloric acid and then with water.

The Si/Al atomic ratio of said mordenite is 12, its mesh volume is 2.750 $nm^3$, its sodium content 300 ppm and its benzene adsorption capacity 9.6% by weight in proportion to the dry solid weight. This mordenite has a needle morphology. The needles have an average length of 5 microns, their hexagonal faces have about a 1 micron length and a 0.3 micron height. This modified mordenite is then mixed with an alumina binder; then this mixture, containing 25% by weight of alumina, is forced through a drawingplate. The extrudates of 1.2 mm diameter are then dried and roasted.

0.4% of platinum are then deposited onto the obtained carrier by cation exchange from tetrammine platinum chloride Pt $(NH_3)_4Cl_2$ with ammonium nitrate as a competing ion. The sodium amount in the final catalyst is 80 ppm. The Si/Al atomic ratio is 12 and the mesh volume 2.750 $nm^3$. The extrudates are then dried and roasted at 500° C.

The obtained catalyst is charged into a fixed-bed catalytic unit and reduced under hydrogen in 2-hour stages at 150, 250, 350 and 450° C. It is then tested with a charge of normal hexane in the following conditions: temperature of 250° C., pressure of 30 bars, n-hexane weight per unit of mordenite weight and per hour: 2, molar ratio of hydrogen to normal hexane: 2. The performance reported in table I was obtained after 30 h of catalyst working conditions.

EXAMPLE 2

Catalyst B conforming with the invention

Catalyst A described in example 1 is charged into a catalytic unit, then oxychlorinated as follows:

temperature increase from room temperature to 400° C. in 1½ hour under a stream of air containing about 1000 ppm by weight of water, injection of chlorine, in moist air maintained at 400° C., as carbon tetrachloride so as to introduce 2% by weight of chlorine in proportion to the mordenite in 1 hour and a half, progressive decrease to room temperature in a stream of moist air.

The mordenite structure was not modified by the oxychlorination treatment. The chlorine content of the obtained catalyst B is about 0.6% by weight.

The obtained catalyst B is then reduced in hydrogen by 2-hour stages at 150, 250, 350 and 450° C., then tested with a n-hexane feed in the conditions indicated in example 1.

The obtained performances are reported in table I and compared with the performances of catalyst A (not oxychlorinated).

Catalyst B according to the invention gives an increased conversion (to a small extent in view of the proximate equilibrium), but the more substantial improvement concerns the dibranched 2,2 $DMC_4$ isomer of high octane number and hence the octane number level.

EXAMPLE 3

Catalyst C (comparison)

In this example mordenite is not exchanged and is used in salt form.

Mordenite in NaM form is roasted under inert gas at a temperature of 500° C. for about 2 hours in order to remove water therefrom. The temperature is then allowed to decrease to 350° C., still under inert gas. Then mordenite is subjected to inert gas bubbling in a trap containing liquid silicium tetrachloride at 20° C. Then the temperature increases up to 380° C. Mordenite is scavenged for 40 minutes with this inert gas saturated with $SiCl_4$, then for about 1 hour with pure inert gas. The decrease to room temperature is peformed under pure inert gas.

The solid is then washed twice at 50° C. with a V/P ratio (volume of water to the weight of dry product) equal to 10 in order to remove the sodium chloride produced during the reaction. The mordenite, obtained in non acid, sodium form NaM, has a Si/Al ratio of 11. Said mordenite is then mixed with an alumina binder in a proportion of 25% by weight of the binder. Then the mixture is forced through a drawing-plate. The extrudates, of 1.2 mm diameter, are then dried and roasted.

0.4% of platinum are then deposited on said carrier by cation exchange from tetrammine platinum chloride $Pt(NH_3)_4Cl_2$, with ammonium nitrate as competing ion. The extrudates are then dried and roased at 500° C.

The obtained catalyst is charged into a catalytic unit and then oxychlorinated in the manner described in example 2: reduced in hydrogen by 2-hour stages at 150, 250, 350 and 450° C., then tested with a n-hexane charge in the conditions indicated in example 1. The performances, given in table I hereinafter, are much lower than those of catalyst B of example 2.

EXAMPLE 4

Catalyst D

Catalyst A, described in example 1, is charged into the catalytic unit, then oxychlorinated according to the operating conditions of example 2 except that the air stream contains about 170 ppm by weight of water (instead of 1000 ppm). The mordenite structure was not changed by the oxychlorination treatment. The chlorine content of the obtained catalyst D is about 0.6% by weight.

This catalyst is then reduced in hydrogen by 2-hour stages at 150°, 250°, 350° and 450° C., then tested with a n-hexane charge in the conditions indicated in example 1.

The performances are reported in table I and compared with the performances of catalyst A (non oxychlorainated) and B (oxychlorinated with a higher water content).

Catalyst D exhibits slightly higher performances than those of catalyst A, non oxychlorinated, but lower than those of catalyst B, oxychlorinated according to the preferred embodiment of the invention.

EXAMPLE 5

Catalyst E (comparison)

A catalyst is prepared, from the mordenite described in example 1, according to the operating conditions described in example 1, except that the ammonium nitrate solution is used as a molar (1 M) solution of ammonium nitrate. After the exchange, the solid is filtered, roasted, then subjected to acid etching in the same conditions as in example 1. The obtained product has a sodium content of 0.5% by weight, a Si/Al atomic ratio of 12, a mesh volume of 2.77 $nm^3$, a benzene adsorption capacity of 9.6% by weight in porportion to the dry solid weight.

This product has a needle morphology. The procedure for obtaining a roasted product containing alumina, mordenite and 0.4% by weight of platinum is the same as in example 1. This product is oxychlorinated according to the operating mode described in example 2, using an air stream containing about 1000 ppm by weight of water. The oxychlorination treatment did not change the structure of mordenite; the chlorine content of the obtained product, called catalyst E, is about 0.6% by weight.

This catalyst is then reduced in hydrogen by 2-hour stages at 150°, 250°, 350° and 450° C., then tested with a n-hexane charge in the conditions indicated in example 1.

The performances are reported in table 1 and compared with those of catalyst B (of a sodium content lower than that of catalyst E).

The performance of catalyst E are lower than those of catalyst B obtained according to the preferred embodiment of the invention and also lower than those of catalyst D.

TABLE I

| CATALYST | C % | S % | Ap % | RON |
|---|---|---|---|---|
| A | 79.5 | 98.6 | 54.7 | 67 |
| B | 81.0 | 98.0 | 66.9 | 69.6 |
| C | 38.0 | 99.0 | 7.3 | 34.0 |
| D | 80 | 98.4 | 59.3 | 67.5 |
| E | 51.2 | 96.1 | 34.2 | 45.1 |

These results show the clear superiority of catalyst B according to the invention for isomerizing n-paraffins and particularly show an improvement in the conversion rate and in the octane number, as well as a clear improvement in the value of approach to equilibrium of 2,2 $DMC_4$.

We claim:

1. A mordenite and group VIII metal containing catalyst, obtained by a process consisting essentially of gas phase oxychlorination of a solid containing at least one group VIII metal of the periodic classification of elements, supported by a mordenite in acid form, said mordenite having a content of alkali metal and alkaline-earth metal cations, expressed in sodium weight equivalent, lower than 0.2% by weight with respect to the dry mordenite weight, adsorbing molecules of kinetic diameter higher than about 6.6 Angstroms, having a mesh volume V of the elementary mesh from 2.73 to 2.78 $nm^3$ and a benzene adsorption capacity higher than 5% by weight, in proportion to the dry mordenite weight, said oxychlorination being conducted at a temperature from about 200 to 500° C. by feeding of a gas mixture containing oxygen, 0.03-4% by weight of water, and chlorine and/or at least one chlorinated compound, the chlorine or chlorinated compound being fed amounting to a total of 0.5-10% by weight, calculated as chlorine weight in proportion to the mordenite weight.

2. A catalyst according to claim 1, wherein the acid mordenite is a mordenite whose Si/Al ratio ranges from about 5 to about 50.

3. A catalyst according to claim 1, wherein the gas mixture used for the oxychlorination contains wet air with chlorine and/or at least one chlorinated compound added thereto.

4. A catalyst according to claim 1, wherein the oxychlorination is performed by contacting the solid with a gas containing oxygen and water, heating up to a temperature of about 300°-480° C., then introducing the chlorine and/or chlorinated compound gas mixture in an amount corresponding to a total of 1-5% by weight, calculated as chlorine weight, in proportion to the mordenite weight.

5. A catalyst according to claim 1, wherein the oxychlorination is performed with chlorine and/or a chlorinated compound selected from the group consisting of hydrochloric acid, carbon tetrachloride, dichloropropane, dichloroethane and chloroform.

6. A catalyst according to claim 1, wherein the group VIII metal is selected from platinum, palladium and nickel.

7. A catalyst according to claim 1, wherein the solid further contains a matrix, in such an amount that the mordenite proportion in the total mordenite and matrix amount is at least 40% by weight.

8. A catalyst according to claim 7, wherein the matrix is alumina.

9. A catalyst according to claim 1, wherein the solid contains 0.05-1% by weight of platinum or palladium or 0.1-10% by weight of nickel.

10. A catalyst according to claim 1, wherein the resultant catalyst has a chlorine content equivalent to about 30-50% of the chlorine feed.

11. A catalyst according to claim 1, wherein the resultant catalyst has a chlorine content following oxychlorination equivalent to about 30% of the chlorine feed.

12. A catalyst according to claim 1, wherein the content of alkali metal and alkaline earth metal cations is lower than 0.1% by weight.

13. A process for the production of a mordenite and group VIII metal catalyst, comprising oxychlorinating a solid containing at least one group VIII metal supported by an acid mordenite, said mordenite being in acid form and having a content of alkali metal and alkaline-earth metal cations, expressed in sodium weight equivalent, lower than 0.2% by weight with respect to the dry mordenite weight, wherein said oxychlorination is conducted at about 200°-500° C., with a gas mixture containing oxygen, 0.03-4% by weight of water, and chlorine and/or at least one chlorinated compound, the chlorine or chlorinated compound feed amounting to a total of 0.5-10% by weight, calculated as chlorine weight in proportion to the mordenite weight.

* * * * *